(12) United States Patent
Wang (10) Patent No.: US 11,100,817 B2
(45) Date of Patent: Aug. 24, 2021

(54) FLEXIBLE ELECTRONIC DEVICE, MANUFACTURING METHOD THEREOF AND FLEXIBLE DISPLAY DEVICE

(71) Applicant: BOE TECHNOLOGY GROUP CO., LTD., Beijing (CN)

(72) Inventor: Pinfan Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/605,341

(22) PCT Filed: Apr. 10, 2019

(86) PCT No.: PCT/CN2019/082114
§ 371 (c)(1),
(2) Date: Oct. 15, 2019

(87) PCT Pub. No.: WO2019/237807
PCT Pub. Date: Dec. 19, 2019

(65) Prior Publication Data
US 2020/0226958 A1    Jul. 16, 2020

(30) Foreign Application Priority Data
Jun. 13, 2018    (CN) .......................... 201810608439.0

(51) Int. Cl.
*G09F 9/30* (2006.01)
*G06F 1/16* (2006.01)
*G06F 1/18* (2006.01)

(52) U.S. Cl.
CPC ............ *G09F 9/301* (2013.01); *G06F 1/1652* (2013.01); *G06F 1/189* (2013.01)

(58) Field of Classification Search
CPC ...... H05K 1/02; H05K 1/0277; H05K 1/0278; H05K 1/0281; H05K 1/11; H05K 1/14;
(Continued)

(56) References Cited

U.S. PATENT DOCUMENTS 9,565,753 B2    2/2017 Hong et al.
9,613,911 B2    2/2017 Rogers et al.
(Continued)

FOREIGN PATENT DOCUMENTS

| CN | 206282861 U | 12/2016 |
|---|---|---|
| CN | 107221549 A | 3/2017 |

(Continued)

*Primary Examiner* — Hoa C Nguyen
(74) *Attorney, Agent, or Firm* — Dilworth & Barrese, LLP.; Michael J. Musella, Esq.

(57) ABSTRACT

The present disclosure provides a flexible electronic device and a manufacturing method thereof, and a flexible display device. The flexible electronic device includes: a flexible base substrate including a plurality of functional element regions spaced away from each other; at least one thin-film transistor disposed in each of the plurality of functional element regions on the flexible base substrate; and a rigid protective layer disposed at least on a side of the at least one TFT opposite to a side where the flexible base substrate is located in each of the plurality of functional element regions and configured to protect the at least one TFT, and a thickness of a central region of the rigid protective layer in each of the plurality of functional element regions is greater than a thickness of an edge region.

18 Claims, 4 Drawing Sheets

(58) Field of Classification Search
CPC ........ H05K 1/0393; H05K 1/09; H05K 1/181; H05K 1/185; G09F 9/301; G06F 1/652
See application file for complete search history.

(56) References Cited

U.S. PATENT DOCUMENTS

| | | | |
|---|---|---|---|
| 10,529,794 | B2 | 1/2020 | Park et al. |
| 2011/0006302 | A1* | 1/2011 | Yamazaki ......... H01L 21/02565 257/43 |
| 2011/0008930 | A1* | 1/2011 | Sasaki ................ H01L 29/7869 438/104 |
| 2011/0193077 | A1* | 8/2011 | Yamazaki ......... H01L 21/02554 257/43 |
| 2015/0048375 | A1 | 2/2015 | Oh et al. |
| 2017/0254518 | A1* | 9/2017 | Vasylyev .............. F21V 17/007 |
| 2017/0293196 | A1 | 10/2017 | Miyatake et al. |
| 2020/0281074 | A1* | 9/2020 | Okimoto .................. H05K 1/03 |

FOREIGN PATENT DOCUMENTS

| | | |
|---|---|---|
| CN | 206685390 U | 4/2017 |
| CN | 108807423 A | 6/2018 |

* cited by examiner

FLEXIBLE ELECTRONIC DEVICE, MANUFACTURING METHOD THEREOF AND FLEXIBLE DISPLAY DEVICE

TECHNICAL FIELD

The present disclosure relates to a flexible electronic device, a manufacturing method thereof and a flexible display device.

BACKGROUND

Flexible electronic devices have unique ductility and low production cost and have broad application prospects in the fields of information, energy, medical treatment and defense.

The flexible electronic device may comprise: a plurality of rigid elements arranged in an array. Each rigid element includes at least one thin-film transistor (TFT), and the rigid elements are connected with each other through wires. As the flexible electronic device will be frequently bent during use, problems such as device damage or wire break must be solved.

SUMMARY

The present disclosure provides a flexible electronic device and a manufacturing method thereof, and a flexible display device, which can effectively reduce the probability of wire breaking and device damaging due to bending of the display device.

At a first aspect, an embodiment of the present disclosure provides a flexible electronic device, the flexible electronic device includes: a flexible base substrate, including a plurality of functional element regions spaced away from each other; at least one thin-film transistor (TFT), disposed in each of the plurality of functional element regions on the flexible base substrate; and a rigid protective layer, disposed at least on a side of the at least one TFT opposite to a side where the flexible base substrate is located, in each of the plurality of functional element regions and configured to protect the at least one TFT, and a thickness of a central region of the rigid protective layer in each of the plurality of functional element regions is greater than a thickness of an edge region of the rigid protective layer.

Optionally, the flexible electronic device further includes a plurality of traces, disposed on the flexible base substrate, and the TFT in each of the plurality of functional element regions is connected with the TFT in another functional element region through at least one of the plurality of traces.

Optionally, in each of the plurality of functional element regions, the rigid protective layer is disposed on a side of the at least one TFT which is different from a side facing the flexible base substrate.

Optionally, an orthographic projection of the edge region of the rigid protective layer on the flexible base substrate is overlapped with an orthographic projection of the trace connecting the TFT in corresponding functional element region and the TFT in another functional element region on the flexible base substrate.

Optionally, the thickness of the rigid protective layer disposed in each of the plurality of functional element regions is gradually reduced from the central region of the rigid protective layer to the edge region.

Optionally, a shape of a longitudinal cross-section of the rigid protective layer disposed in each of the plurality of functional element regions is a regular trapezoid.

Optionally, a shape of a longitudinal cross-section of the rigid protective layer disposed in each of the plurality of functional element regions is arciform.

Optionally, a material of the rigid protective layer disposed in each of the plurality of functional element regions includes rubber or silica gel.

Optionally, a material of the plurality of traces includes metallic material or conductive polymeric material.

Optionally, the flexible electronic device is a sensor, and a tensile strain rate of the plurality of traces is less than or equal to 200%.

Optionally, the flexible electronic device is a flexible display substrate, and a tensile strain rate of the plurality of traces is less than or equal to 100%.

Optionally, an orthographic projection of the functional element region on the flexible display substrate is greater than a region encircled by an orthographic projection of a contour of the at least one TFT on the flexible display substrate.

Optionally, the flexible electronic device further comprises a lug boss structure disposed between an arranging region of the at least one TFT and the flexible display substrate in each of the plurality of functional element regions, and a hardness of the lug boss structure is greater than a hardness of a region except the lug boss structure.

At a second aspect, an embodiment of the present disclosure provides a manufacturing method of a flexible electronic device, manufacturing method includes: providing a flexible base substrate, the flexible base substrate including a plurality of functional element regions spaced away from each other; forming at least one TFT in each of the plurality of functional element regions; and forming a rigid protective layer at least on a side of the at least one TFT opposite to a side where the flexible base substrate is located in each of the plurality of functional element regions, the rigid protective layer being configured to protect the at least one TFT, and a thickness of a central region of the rigid protective layer disposed in each of the plurality of functional element regions is greater than a thickness of an edge region of the rigid protective layer.

Optionally, before the forming the rigid protective layer, a manufacturing method further includes forming a plurality of traces on the flexible base substrate, and the TFT in each of the plurality of functional element regions is connected with the TFT in another functional element region through at least one of the plurality of traces.

Optionally, the forming a rigid protective layer at least on a side of the at least one TFT opposite to a side where the flexible base substrate is located in each of the plurality of functional element regions includes: forming the rigid protective layer on a side of the at least one TFT which is different from a side facing the flexible base substrate.

Optionally, the forming the rigid protective layer on a side of the at least one TFT which is different from a side facing the flexible base substrate includes: performing a surface tension modification treatment on the flexible base substrate on which the at least one TFT and the plurality of traces are located by using a gray mask, so that a surface tension of a central region of each of the plurality of functional element regions is greater than a surface tension of an edge region of the functional element region, and the surface tension of the edge region of the functional element regions is greater than a surface tension of a region in the flexible base substrate except the plurality of functional element regions; coating a liquid rigid material on the flexible base substrate after the surface tension modification treatment; and forming the rigid protective layer in each of the plurality of functional element regions by solidifying the liquid rigid material.

Optionally, the forming the rigid protective layer on a side of the at least one TFT which is different from a side facing the flexible base substrate includes: forming a photoresist film on the flexible base substrate on which the at least one TFT and the plurality of traces are located; and performing an exposure treatment on the photoresist film by using a gray mask, performing a development treatment on the photoresist film after the exposure treatment, to form the rigid protective layer in each of the plurality of functional element regions.

Optionally, before the forming the at least one TFT and the plurality of traces on the flexible base substrate, the method further comprises performing a surface hardness modification treatment on the flexible base substrate.

Optionally, the performing the surface hardness modification treatment on the flexible base substrate includes: forming a lug boss structure in each of the plurality of functional element regions of the flexible base substrate, the lug boss structure is arranged to correspond to a region the at least one TFT is located, and a hardness of the lug boss structures is greater than a hardness of a region except the lug boss structure.

At a third aspect, an embodiment of the present disclosure provides a flexible display device comprising the flexible electronic device according to the first aspect.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

Embodiments of the present disclosure will be in detail described hereinafter, and examples of the embodiments are shown in the drawings, in which the same or similar reference number is denoted as the same or similar members or the members with the same or similar function throughout. The described embodiments in conjunction with the accompanying drawings of the present disclosure are exemplary, only is used to explain the present disclosure and do not intend to limit the present disclosure.

In the description, the description with referring to the terms "an embodiment", "some embodiments", "example", "specific example" or "some examples" means that the specific feature, structure, material or character described with connection with the embodiment or example is included in at least one embodiment or example of the present disclosure. In the description, the schematic description of the above terms is not necessary to direct to the same embodiment or example. The described feature, structure, material or character may be combined in any suitable manner in any or a plurality of embodiments or examples. Further, in case of no conflict, different embodiments or examples and features in different embodiments or example described in the specification can be combined.

Further, the terms, such as "first," "second," or the like, which are used in the description and the claims of the present disclosure, are not intended to indicate or imply the relative importance or implicitly indicate the amount of the features. Thus, the features defined by "first," "second," may explicitly indicate or implicitly includes at least one feature. In the description of the present disclosure, unless otherwise defined, "a plurality of" means two or more.

In order to avoid damaging the TFT in the rigid element during the bending of the flexible display device, a rigid protective layer may be disposed outside each rigid element. A portion of the flexible trace in the flexible electronic device that is wrapped by the rigid protective layer will not be easily deformed, and a portion not wrapped by the rigid protective layer will be susceptible to deformation. The stress at positions of the flexible trace in contact with an outer surface of the rigid protective layer is relatively concentrated, resulting in a greater risk of wire break at the positions of the flexible trace in contact with the outer surface of the rigid protective layer.

In order to make the objects, technical solutions and advantages of the present disclosure more clear, the embodiments of the present disclosure will be further described in detail below with reference to the accompanying drawings.

Figure 1:
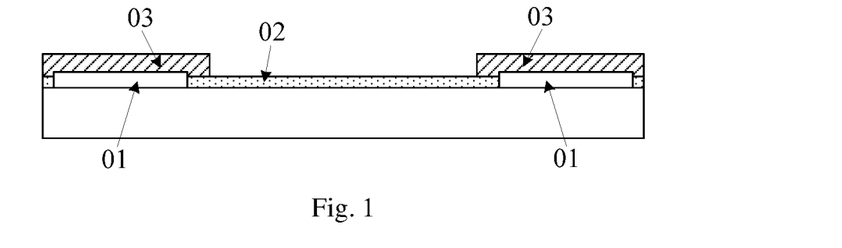
FIG. 1 is a schematic structural view of a flexible electronic device.

As shown in FIG. 1 which is a schematic structural view of a flexible electronic device, the flexible electronic device may comprise: a plurality of rigid elements 01 arranged in an array and a plurality of flexible traces 02. Each rigid element 01 includes at least one TFT. The TFTs in any two adjacent rigid elements 01 are connected with each other through at least one flexible trace 02. A rigid protective layer 03 is disposed outside each rigid element 01. The rigid protective layer 03 can protect the TFT in the rigid element 01.

As the portion of the flexible trace 02 wrapped by the rigid protective layer 03 will not be easily deformed (namely the tensile strain rate is low, and the tensile strain rate refers to a change rate of the length of the flexible trace under the stretching action of the external force) and the portion not wrapped by the rigid protective layer 03 is easily deformed (namely the tensile strain rate is relatively high), the stress at positions of the flexible trace 02 in contact with an outer surface of the rigid protective layer 03 is relatively concentrated, resulting in a greater risk in wire break at the positions of the flexible trace 02 in contact with the outer surface of the rigid protective layer 03.

Figure 2:
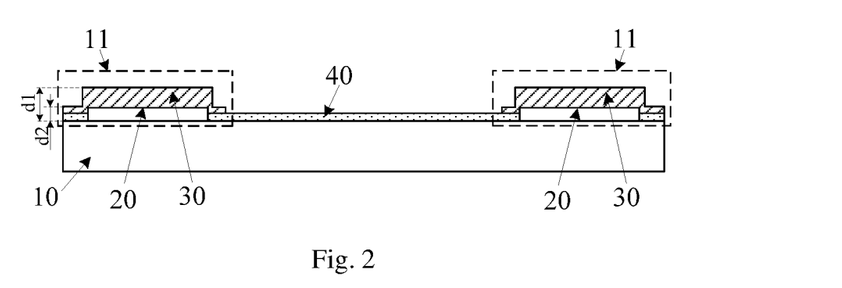
FIG. 2 is a schematic structural view of a flexible electronic device provided by an embodiment of the present disclosure.

As shown in FIG. 2 which is a schematic structural view of a flexible electronic device provided by the embodiment of the present disclosure, the flexible electronic device may comprise: a flexible base substrate 10; at least one thin-film transistor (TFT) 20, disposed on the flexible base substrate 10 in each functional element region 11; and a rigid protective layer 30, disposed at least at a side of the at least one TFT 20 opposite to a side where the flexible base substrate is located in each functional element region 11, and configured to protect the at least one TFT 20, wherein a thickness of a central region of the rigid protective layer 30 disposed in each functional element region 11 is greater than a thickness of an edge region of the rigid protective layer.

Illustratively, in each functional element region 11, the rigid protective layer 30 wraps outside of the at least one TFT 20.

Illustratively, in each functional element region, the rigid protective layer is disposed on a side of the at least one TFT which is different from a side of the at least one TFT facing the flexible base substrate, for instance, on a side of the at least one TFT 20 opposite to a side where the flexible base substrate is located, namely an upper side, a left side and a right side, so as to wrap the outside of the at least one TFT 20.

A plurality of traces 40, e.g., flexible traces, are also disposed on the flexible base substrate 10. The TFT 20 in each functional element region 11 is connected with the TFT 20 in another functional element region through at least one flexible trace 40.

Wherein, a thickness d1 of a central region of the rigid protective layer 30 in each functional element region 11 is greater than a thickness d2 of an edge region. As can be seen from FIG. 2, the thickness of the rigid protective layer 30 may refer to a distance between a surface of a side of the rigid protective layer 30 away from the flexible base substrate 10 and a bearing surface on which the TFT 20 is provided.

Illustratively, in the case that one TFT is disposed in the functional element region, the central region of the rigid protective layer may coincide with an arrangement region of the TFT or slightly larger than the arrangement region of the TFT; and in the case that at least two TFTs are disposed in the functional element region, the central region of the rigid protective layer may coincide with a region surrounded by outside of the at least two TFTs or slightly larger than the region surrounded by outside of the at least two TFTs, so as to protect the TFTs.

The hardness at positions of the rigid protective layer 30 disposed in each functional element region 11 is positively related to the thickness at corresponding positions, that is, when the thickness of the rigid protective layer 30 at a certain position is larger, the hardness at this position is higher. As the at least one TFT 20 disposed in each functional element region 11 is wrapped by the central region of the rigid protective layer 30 and the thickness of the central region of the rigid protective layer 30 is large, the hardness of the central region of the rigid protective layer 30 is high, so the rigid protective layer 30 can have good protective function on the TFT 20 wrapped by the rigid protective layer.

Moreover, since the thickness of the edge region of the rigid protective layer 30 is small and the hardness of the edge region of the rigid protective layer 30 is low, and the hardness at the positions of the rigid protective layer 30 is negatively related to the tensile strain rate at corresponding positions of the flexible trace 40 wrapped by the rigid protective layer, the tensile strain rate of the portion of the flexible trace 40 wrapped by the rigid protective layer is higher than the tensile strain rate of the portion of the flexible trace wrapped by the rigid protective layer in related art, thereby avoiding the phenomenon that the stress at the positions of the flexible trace 40 in contact with the outer surface of the rigid protective layer 30 is concentrated, and effectively reducing the probability of wire break at the positions of the flexible trace 40 in contact with the outer surface of the rigid protective layer 30 on the premise that the rigid protective layer 30 can have good protective function on the TFT 20 wrapped by the rigid protective layer.

In summary, in the flexible electronic device provided by the embodiment of the present disclosure, at least one TFT and the rigid protective layer wrapping outside of the at least one TFT are disposed in each functional element region of the flexible base substrate, the TFT in each functional element region is connected with the TFT in another functional element region through at least one flexible trace; and the thickness of the central region of the rigid protective layer disposed in each functional element region is greater than the thickness of the edge region. As the hardness at the positions of the rigid protective layer disposed in each functional element region is positively related to the thickness at corresponding positions and the thickness of the edge region of the rigid protective layer in the flexible electronic device is small, the tensile strain rate of the portion of the flexible trace wrapped by the rigid protective layer is higher than the tensile strain rate of the portion of the flexible trace wrapped by the rigid protective layer in related art, thereby avoiding the phenomenon that the stress at the positions of the flexible trace in contact with the outer surface of the rigid protective layer is concentrated, and effectively reducing the probability of wire break at the positions of the flexible trace in contact with the outer surface of the rigid protective layer on the premise that the rigid protective layer can have good protective function on the TFT wrapped by the rigid protective layer.

In the embodiment of the present disclosure, the rigid protective layer disposed on each functional element region has multiple shapes, and exemplary description will be given in the embodiments of the present disclosure by taking two implementations as an example.

Figure 3:
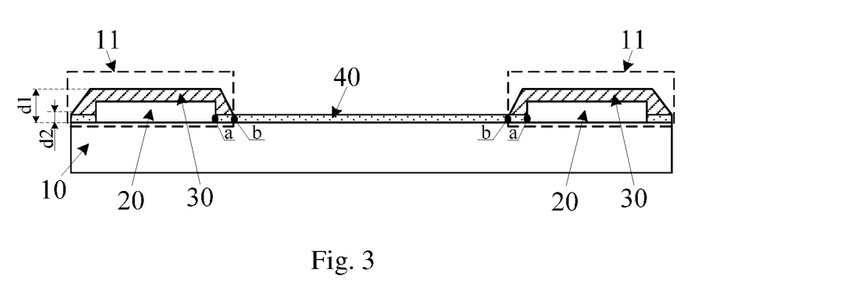
FIG. 3 is a schematic structural view of another flexible electronic device provided by an embodiment of the present disclosure.

In the first implementation, as shown in FIG. 3 which is a schematic structural view of another flexible electronic device provided by the embodiment of the present disclosure, the shape of a longitudinal cross-section of the rigid protective layer 30 disposed in each functional element region 11 is a regular trapezoid, and the longitudinal cross-section is perpendicular to a bearing surface of the flexible base substrate 10. The TFT 20, the rigid protective layer 30 and the flexible trace 40 may be disposed on the bearing surface. It should be noted that as the rigid protective layer 30 wraps the TFT 20 and the shape of the longitudinal cross-section of the rigid protective layer 30 as show in FIG. 3 is a pattern obtained by taken along a certain direction, the shape of the rigid protective layer 30 as shown in FIG. 3 is not a regular trapezoid. In actual application, the overall shape of the rigid protective layer 20 after wrapping the TFT 20 is a regular trapezoid.

Figure 4:
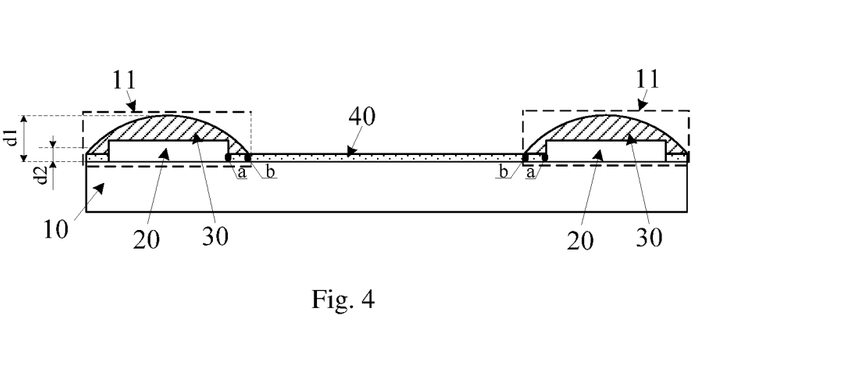
FIG. 4 is a schematic structural view of still another flexible electronic device provided by an embodiment of the present disclosure.

In second implementation, as shown in FIG. 4 which is a schematic structural view of still another flexible electronic device provided by the embodiment of the present disclosure, the shape of a longitudinal cross-section of the rigid protective layer 30 disposed in each functional element region 11 is arciform, and the longitudinal cross-section is perpendicular to a bearing surface of the flexible base substrate 10. It should be noted that as the rigid protective layer 30 wraps the TFT 20 and the shape of the longitudinal cross-section of the rigid protective layer 30 as shown in FIG. 4 is a pattern obtained by taken along a certain direction, the shape of the rigid protective layer in FIG. 4 is not arciform. In actual application, the overall shape of the rigid protective layer 30 after wrapping the TFT 20 is arciform.

As shown in FIGS. 3 and 4, the thickness of the rigid protective layer 30 disposed in reach functional element region 11 is gradually reduced from the central region to the edge region; the tensile strain rate at a position a of the flexible trace 40 connected with the TFT 20 is minimum, thus ensuring the effective connection between the TFT 20 and the flexible trace 40; the tensile strain rate at a position b of the flexible trace 40 in contact with the outer surface of the rigid protective layer 30 is maximum, thus ensuring that the flexible trace 40 can be fully stretched; the tensile strain rate of the flexible trace 40 from the position a to the position b is gradually increased, thereby avoiding the phenomenon that the tensile strain rate at a certain position of the flexible trace 40 suddenly changes, resulting in the sudden change of the tensile strain rate at the position and easily breaking of the flexible trace at this position, and further reducing the probability of wire breaking of the flexible trace 40.

In the embodiment of the present disclosure, as shown in FIG. 3 or 4, an orthographic projection of the rigid protective layer 30 disposed in each functional element region 11 on the flexible base substrate 10 is overlapped with an orthographic projection of the flexible trace 30 connected with the TFT 20 wrapped by the rigid protective layer 30 on the flexible base substrate 10.

Optionally, an orthographic projection of the edge region of the rigid protective layer on the flexible base substrate is overlapped with an orthographic projection of the trace which connects the TFT in corresponding functional element region and the TFT in another functional element region on the flexible base substrate.

Optionally, during the use of the flexible electronic device, in order to ensure that the rigid protective layer 30 disposed in each functional element region 11 can effectively protect the TFT 20 wrapped by the rigid protective layer, a thickness d1 of the central region of the rigid protective layer can satisfy: $0.5 \leq d1 \leq 5$ μm. In order to ensure that the flexible trace 40 can be fully stretched, a thickness d2 of the edge region of the rigid protective layer 30 disposed in each functional element region 11 can satisfy: $0.3 \leq d2 \leq 0.9$ μm. In an optional implementation, the thickness d2 of the edge region is slightly greater than the thickness of the flexible trace 40.

Optionally, a material of the rigid protective layer 30 disposed in each functional element region 11 may include rubber or silica gel. A material of the flexible trace 40 may include metallic material or conductive polymeric material. For instance, the metallic material may include metal aluminum, metal silver, alloy materials, etc.; and the polymer conductive material may include polyacetylene, polypyrrole, polyparaphenylene, polyphenylene sulfide, polyanitrace, etc.

Figure 5:
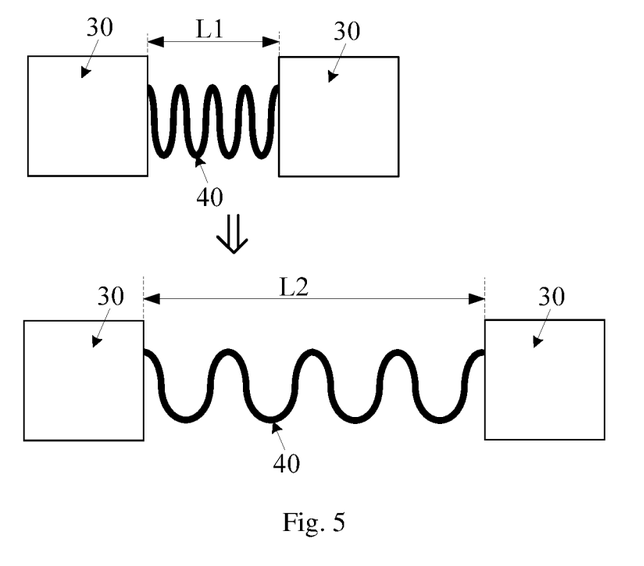
FIG. 5 is an effect diagram illustrating a deformation of a flexible trace in the flexible electronic device provided by an embodiment of the present disclosure.

In the embodiment of the present disclosure, as shown in FIG. 5 which is an effect diagram illustrating the deformation of the flexible trace in the flexible electronic device provided by the embodiment of the present disclosure, the tensile strain rate of the flexible trace 40 in the flexible electronic device satisfies the following computing formula:

$$\delta = \frac{L2 - L1}{L1} \times 100\%;$$

wherein, δ refers to the tensile strain rate of the flexible trace 40; L1 refers to a distance between two rigid protective layers 30 corresponding to the TFTs connected by the flexible trace 40 when the flexible trace 40 is not stretched; and L2 refers to a distance between two rigid protective layers 30 corresponding to the TFTs connected by the flexible trace 40 after the flexible trace 40 is stretched.

In an optional implementation, the flexible electronic device may be a sensor, a flexible display substrate, etc.; the usages of the flexible electronic device are different; and the tensile strain rate of the flexible trace 40 in the flexible electronic device is also different.

Illustratively, when the flexible electronic device is a sensor, the flexible electronic device may be disposed in a display device to detect the temperature, the brightness or the like of the display device; the flexible electronic device may also be attached to the skin of the human body to detect the body temperature, the heart rate or the like of the human body; and in order to avoid the flexible trace 40 from being broken, the tensile strain rate of the flexible trace 40 is less than or equal to 200%.

When the flexible electronic device is a flexible display substrate, the flexible electronic device may be disposed in a display device; each functional region in the flexible electronic device is one pixel; and in order to guarantee the display quality of the display device, the tensile strain rate of the flexible trace 30 shall not be overlarge, and the tensile strain rate of the flexible trace 30 is generally less than or equal to 100%.

Herein, it should be noted that at least one TFT in each functional element region may form a TFT group, that is, one TFT group is disposed in each functional element region; each TFT group may include at least one TFT; a region of each functional element region may be greater than an arrangement region in which the TFT group is provided; each functional element region may also include a peripheral region at a periphery of a region in which the at least one TFT is arranged; and the trace for externally connection of the TFT in the functional element region may be partially disposed in the peripheral region.

Illustratively, the edge region of the rigid protective layer is overlapped with the peripheral region of the functional element region, so the edge region with small thickness of the rigid protective layer is overlapped with an orthographic projection of the trace for externally connection of the TFT in the functional element region on the flexible base substrate, and the difference between the tensile strain rate of the portion of the flexible trace wrapped by the rigid protective layer and the tensile strain rate of the portion of the flexible trace not wrapped by the rigid protective layer is small, thereby well avoiding the phenomenon that the stress at the positions of the flexible trace in contact with the outer surface of the rigid protective layer is relatively concentrated. Alternatively, the edge region of the rigid protective layer may be slightly smaller than the peripheral region of the functional element region, that is, the central region of the rigid protective layer may cover a portion of the peripheral region.

Alternatively, the edge region of the rigid protective layer may be disposed outside of the peripheral region of the functional element region, and the edge region of the rigid protective layer may be partially overlapped or completely overlapped or not overlapped with the peripheral region of the functional element region, so the tensile strain rate of a portion close to a portion not wrapped by the rigid protective layer in the portion of the flexible trace wrapped by the rigid protective layer is high and has small difference from the tensile strain rate of the portion of the flexible trace not wrapped by the rigid protective layer, thereby avoiding the phenomenon that the stress at the positions of the flexible trace in contact with the outer surface of the rigid protective layer is relatively concentrated to a certain degree.

Illustratively, an area of the rigid protective layer may be set to be the same with an area of the functional element region or slightly greater than the region of the functional element region; the central region of the rigid protective layer corresponds to a central region of the functional element region; if one TFT is included, the central region corresponds to a central region of the TFT; and if two TFTs are included, the central region may fall at an intermediate point between the two TFTs. No limitation will be given here in the application.

In summary, in the flexible electronic device provided by the embodiment of the present disclosure, at least one TFT and the rigid protective layer wrapping outside of the at least one TFT are disposed in each functional element region of the flexible base substrate; the TFT in each functional element region is connected with the TFT in another functional element region through at least one flexible trace; and a thickness of the central region of the rigid protective layer disposed in each functional element region is greater than the thickness of the edge region. As the hardness at the positions of the rigid protective layer disposed in each functional element region is positively related to a thickness at corresponding positions, and the thickness of the edge region of the rigid protective layer in the flexible electronic device is small, the tensile strain rate of the portion of the flexible trace wrapped by the rigid protective layer is higher than the tensile strain rate of the portion of the flexible trace wrapped by the rigid protective layer in related art, thereby avoiding the phenomenon that the stress at the positions of the flexible trace in contact with the outer surface of the rigid protective layer is relatively concentrated, and effectively reducing the probability of wire break at the positions of the flexible trace in contact with the outer surface of the rigid protective layer on the premise that the rigid protective layer can have good protective function on the TFT wrapped by the rigid protective layer.

Figure 6:
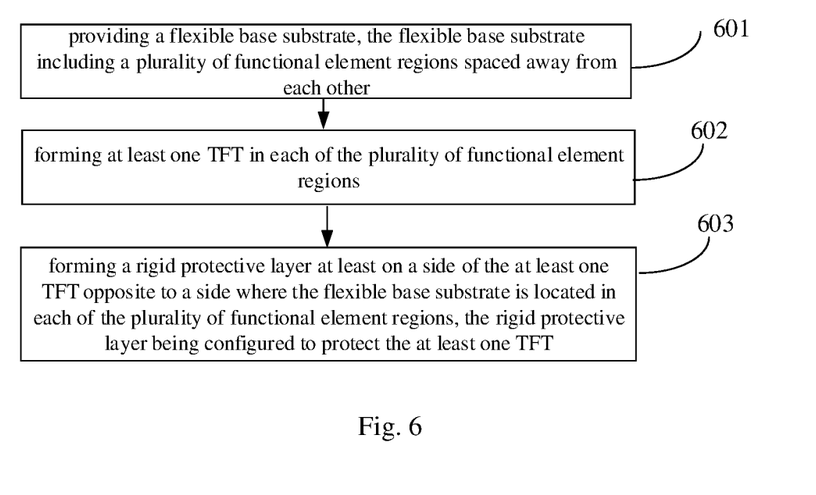
FIG. 6 is a flowchart of a manufacturing method for a flexible electronic device provided by an embodiment of the present disclosure.

As shown in FIG. 6 which is a flowchart of a method for manufacturing a flexible electronic device provided by the embodiment of the present disclosure, the method is used for manufacturing the flexible electronic device as shown in FIG. 2 and may comprise:

S601: providing a flexible base substrate including a plurality of functional element regions spaced apart from each other;

S602: forming at least one TFT in each of the plurality of functional element regions; and

S603: forming a rigid protective layer at least on a side of the at least one TFT opposite to a side in which the flexible base substrate is disposed, in each of the plurality of functional element regions, in which the rigid protective layer is configured to protect the at least one TFT, wherein the thickness of a central region of the rigid protective layer is greater than the thickness of an edge region.

Optionally, before the step of forming the rigid protective layer, the method may further comprise:

forming a plurality of traces on the flexible base substrate, wherein the TFT in each functional element region is connected with the TFT in another functional element region through at least one of the plurality of traces.

wherein the flexible base substrate includes a plurality of functional element regions spaced apart from each other; at least one TFT is formed in each of the plurality of functional element regions; and the TFT in each functional element region is connected with the TFT in another functional element region through at least one flexible trace.

Optionally, the step of forming the rigid protective layer at least on a side of the at least one TFT opposite to a side in which the flexible base substrate is disposed includes:

forming the rigid protective layer on a side of the at least one TFT which is different from a side facing the flexible base substrate.

Illustratively, the rigid protective layer is formed on the side of the at least one TFT which is different from the side facing the flexible base substrate, and wraps the outside of the at least one TFT.

In summary, in the method for manufacturing the flexible electronic device provided by the embodiment of the present disclosure, at least one TFT and the rigid protective layer wrapping the outside of the at least one TFT are disposed in each functional element region of the flexible base substrate; the TFT in each functional element region is connected with a TFT in another functional element region through at least one flexible trace; and the thickness of the central region of the rigid protective layer formed in each functional element region is greater than the thickness of the edge region. As the hardness at a position of the rigid protective layer formed in each functional element region is positively related to a thickness at a corresponding position and the thickness of the edge region of the rigid protective layer in the flexible electronic device is small, the tensile strain rate of the portion of the flexible trace wrapped by the rigid protective layer is higher than the tensile strain rate of the portion of the flexible trace wrapped by the rigid protective layer in related art, thereby avoiding the phenomenon that the stress at the positions of the flexible trace in contact with the outer surface of the rigid protective layer is relatively concentrated, and effectively reducing the probability of wire break at the positions of the flexible trace in contact with the outer surface of the rigid protective layer on the premise that the rigid protective layer can have good protective function on the TFT wrapped by the rigid protective layer.

Figure 7:
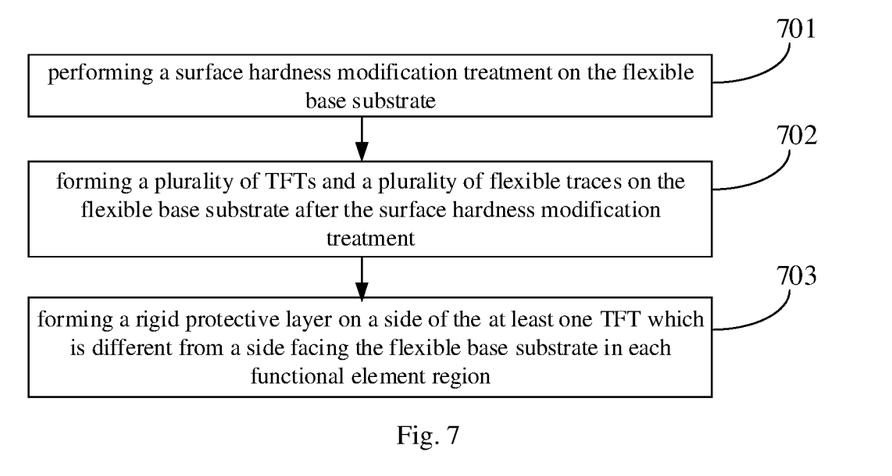
FIG. 7 is a flowchart of another manufacturing method for a flexible electronic device provided by an embodiment of the present disclosure.

As shown in FIG. 7 which is a flowchart of another method for manufacturing a flexible electronic device provided by the embodiment of the present disclosure, the method is used for manufacturing the flexible electronic device as shown in FIG. 2, 3 or 4 and may comprise:

S701: performing a surface hardness modification treatment on the flexible base substrate.

In the embodiment of the present disclosure, in order to improve the performances of the flexible electronic device, the flexible base substrate in the flexible electronic device needs to be subjected to the hardness modification treatment, so that the hardness corresponding to the functional element region in the flexible base substrate is greater than the hardness corresponding to a region of the flexible base substrate except that the functional element region.

Figure 8:
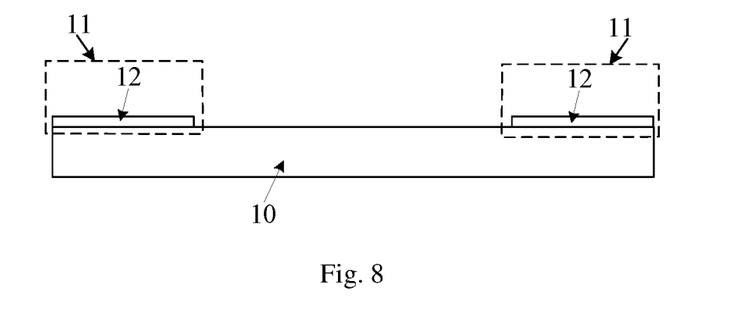
FIG. 8 is an effect diagram after performing a surface hardness modification treatment on a flexible base substrate in an embodiment of the present disclosure.

Illustratively, as shown in FIG. 8 which is an effect diagram after performing the surface hardness modification treatment on the flexible base substrate in the embodiment of the present disclosure, the flexible base substrate 10 may be subjected to graphical processing, so that a plurality of lug boss structures 12 are formed on the flexible base substrate 10. The hardness of a region where the lug boss structure 12 is located is greater than the hardness of a region except the region where the lug boss structure 12 is located. The region where the lug boss structure 12 is located is the functional element region 11. The graphical processing may include photoresist coating, exposure, development, etching and photoresist stripping.

S702: forming a plurality of TFTs and a plurality of flexible traces on the flexible base substrate after the surface hardness modification treatment.

Wherein, at least one TFT is formed in each functional element region (namely on each lug boss structure), and the TFT in each functional element region is connected with the TFT in another functional element region through at least one flexible trace.

In the embodiment of the present disclosure, after the flexible base substrate is subjected to the hardness modification treatment, the plurality of TFTs and the plurality of flexible traces may be directly formed, or the plurality of TFTs and the plurality of flexible traces may be formed on the flexible base substrate obtained after the hardness modification treatment by transfer printing.

Illustratively, when the plurality of TFTs and the plurality of flexible traces need to be formed on the flexible base substrate by the transfer printing, firstly, the plurality of TFTs and the plurality of flexible traces may be formed on another base substrate; secondly, the flexible base substrate after the hardness modification treatment is subjected to a prestrain treatment which refers to stretching the flexible base substrate by a certain distance along each of a length direction and a width direction; thirdly, the plurality of TFTs and the plurality of flexible traces formed on the base substrate are transferred to the flexible base substrate with prestrain, and the TFT needs to be formed in the functional element region; and finally, the prestrain applied to the flexible base substrate is released so as to form the plurality of TFTs and the plurality of flexible traces on the flexible base substrate. The forming of the plurality of TFTs and the plurality of flexible traces on the flexible base substrate by the transfer printing can increase the tensile strain rate of the flexible traces, so the tensile effect of the subsequently formed flexible electronic device can be better.

S703: forming a rigid protective layer on a side of the at least one TFT which is different from a side facing the flexible base substrate in each functional element region.

For instance, the rigid protective layer that wraps outside of the at least one TFT is formed.

In the embodiment of the present disclosure, the step of forming the rigid protective layer that wraps the outside of the at least one TFT in each functional element region has multiple implementations. Illustrative description will be given in the embodiment of the present disclosure by taking the following two implementations as an example.

In the first implementation, the step of forming the rigid protective layer on a side of the at least one TFT which is different from a side facing the flexible base substrate, in each functional element region may include the following steps:

A1: performing a surface tension modification treatment on the flexible base substrate provided with the plurality of TFTs and the plurality of flexible traces by using a gray mask, so that a surface tension of the central region of the functional element region is greater than a surface tension of the edge region of the functional element region and the surface tension of the edge region of the functional element region is greater than a surface tension of a region in the flexible base substrate except the plurality of functional element regions.

Figure 9:
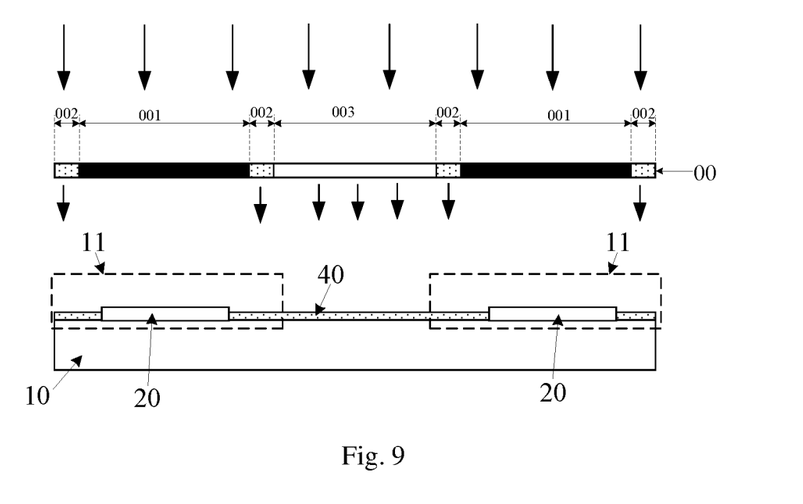
FIG. 9 is a schematic diagram illustrating performing a surface tension modification treatment on the flexible base substrate on which a plurality of TFTs and a plurality of flexible traces are located in an embodiment of the present disclosure.

Illustratively, as shown in FIG. 9 which is a schematic diagram illustrating a process of performing the surface tension modification treatment on the flexible base substrate on which the plurality of TFTs and the plurality of flexible traces are formed in the embodiment of the present disclosure, a gray mask 00 may be adopted to perform the surface tension modification treatment on the flexible base substrate, and the gray mask 00 may include: a nontransparent region 001, a translucent region 002 and a transparent region 003. Wherein, the light transmittance of the nontransparent region 001 is greater than that of the translucent region 002, and the light transmittance of the translucent region 002 is greater than that of the transparent region 003. The nontransparent region 001 corresponds to a central region in the functional element region 11; the translucent region 002 may correspond to an edge region of the functional element region 11; and the transparent region 003 may correspond to a region in the flexible base substrate 10 except the plurality of functional element regions 11. When ultraviolet light runs through the gray mask 00 and is irradiated onto the flexible base substrate 11, as the light transmittances of the regions of the mask are different, after corresponding regions in the flexible base substrate are radiated by the ultraviolet light with different light intensities, the hydrophibility and hydrophobility of the regions in the flexible base substrate also change. Moreover, the hydrophibility and hydrophobility of the flexible base substrate are relevant to surface tension, after the ultraviolet light runs through the gray mask 00 and is irradiated onto the flexible base substrate 10, the surface tension of the central region in the functional element region 11 of the flexible base substrate 10 is greater than the surface tension of the edge region in the functional element region 11, and the surface tension of the edge region in the functional element region 11 is greater than a surface tension of a region in the flexible base substrate 10 except the plurality of functional element regions 11.

B1: coating a liquid rigid material on the flexible base substrate after the surface tension modification treatment.

Optionally, the liquid rigid material may include a rubber material or a silica gel material.

Figure 10:
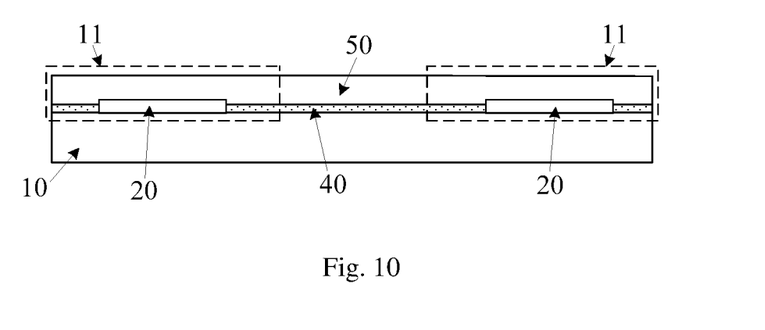
FIG. 10 is an example diagram illustrating the process of coating a liquid rigid material on the flexible base substrate after the surface tension modification treatment in e embodiment of the present disclosure.

In the embodiment of the present disclosure, as shown in FIG. 10 which is an example diagram illustrating coating the liquid rigid material on the flexible base substrate after the surface tension modification treatment in the embodiment of the present disclosure, after the flexible base substrate 10 is subjected to the surface tension treatment, a liquid rigid material 50 may be coated on the flexible base substrate 10.

As a thickness of the liquid rigid material on a surface of the flexible base substrate is positively related to the surface tension of the base substrate and the surface tensions of regions in the flexible base substrate are different, after the liquid rigid material is coated on the flexible base substrate, the thickness of the liquid rigid material formed in a region of the flexible base substrate with high surface tension is large, and the thickness of the liquid rigid material formed in a region of the flexible base substrate with low surface tension is small. It should be noted that in the process of performing the surface tension modification treatment on the flexible base substrate, it should be guaranteed that the liquid rigid material is formed in a region of the flexible base substrate except the functional element region.

C1: forming the rigid protective layer in each functional element region by solidifying the liquid rigid material.

In the embodiment of the present disclosure, the rigid protective layer may be formed in each functional element region after the liquid rigid material is solidified, and the thickness of the central region of the rigid protective layer is greater than the thickness of the edge region.

In the second implementation, the step of forming the rigid protective layer on a side of the at least one TFT which is different from a side facing the flexible base substrate in each functional element region may include the following steps:

A2: forming a photoresist film on the flexible base substrate on which the plurality of TFTs and the plurality of flexible traces are formed.

In the embodiment of the present disclosure, a photoresist film may be formed on the flexible base substrate on which the plurality of TFTs and the plurality of flexible traces are formed. The photoresist film may be a positive photoresist film and may also be a negative photoresist film.

B2: performing an exposure treatment on the photoresist film by using a gray mask, performing a development treatment on the photoresist film after the exposure treatment, to form the rigid protective layer in each functional element region.

Illustratively, taking the case that a material of the photoresist film is a positive photoresist as an example, after the gray mask as shown in FIG. 9 is adopted to perform the exposure treatment and the development treatment on the photoresist film, the photoresist film corresponding to the transparent region 003 is completely removed; the thickness of the photoresist film corresponding to the translucent region 002 is reduced; and the thickness of the photoresist film corresponding to nontransparent regions 001 does not change, so as to form the rigid protective layer in each functional element region.

Optionally, a shape of a longitudinal cross-section of the rigid protective layer formed in each functional element region is a regular trapezoid.

Optionally, a shape of the longitudinal cross-section of the rigid protective layer formed in each functional element region is arciform.

It should be noted that the working principle of the flexible electronic device described above may refer to a corresponding part in the structure embodiments of the foregoing flexible electronic device, and no further description will be given here in the embodiment of the present disclosure.

In summary, in the method for manufacturing the flexible electronic device provided by an embodiment of the present disclosure, at least one TFT and the rigid protective layer wrapping outside of the at least one TFT are disposed in each functional element region of the flexible base substrate; the TFT in each functional element region is connected with the TFT in another functional element region through at least one flexible trace; and the thickness of the central region of the rigid protective layer formed in each functional element region is greater than the thickness of the edge region. As the hardness at the position of the rigid protective layer formed in each functional element region is positively related to the thickness at a corresponding position and the thickness of the edge region of the rigid protective layer in the flexible electronic device is small, the tensile strain rate of the portion of the flexible trace wrapped by the rigid protective layer is higher than the tensile strain rate of the portion of the flexible trace wrapped by the rigid protective layer in related art, thereby avoiding the phenomenon that the stress at the position of the flexible trace in contact with the outer surface of the rigid protective layer is relatively concentrated, and effectively reducing the probability of wire break at the position of the flexible trace in contact with the outer surface of the rigid protective layer on the premise that the rigid protective layer can have good protective function on the TFT wrapped by the rigid protective layer.

The embodiment of the present disclosure further provides a flexible display device, which may comprise the flexible electronic device as shown in FIG. 2, 3 or 4. The flexible display device may be: any product or component having display function such as e-paper, a mobile phone, a tablet PC, a TV, a display, a notebook computer, a digital photo frame or a navigator.

The above description is only the embodiment of the present disclosure, and is not intended to limit the present disclosure. Any modification, equivalent substitution, improvement or the like made within the spirit and principles of the present disclosure should fall within the scope of protection of the present disclosure.

The above-mentioned storage medium may be a read-only memory (ROM), a magnetic disk, an optical disk, etc. While the embodiments of the present disclosure have been shown and described above, it should be understood that the above embodiments are illustrative and are not to be construed as limiting the present disclosure. Change, modification, replacement and deformation may be made to the above embodiments by those skilled in the art within the scope of the present disclosure.

The application claims priority to the Chinese patent application No. 201810608439.0 filed Jun. 13, 2018, the disclosure of which is incorporated herein by reference as part of the application.

What is claimed is:

1. A flexible electronic device, comprising:
a flexible base substrate, including a plurality of functional element regions spaced away from each other;
at least one thin-film transistor (TFT), disposed in each of the plurality of functional element regions on the flexible base substrate; and
a rigid protective layer, disposed at least on a side of the at least one TFT opposite to a side where the flexible base substrate is located, in each of the plurality of functional element regions and configured to protect the at least one TFT, wherein
a thickness of a central region of the rigid protective layer in each of the plurality of functional element regions is greater than a thickness of an edge region of the rigid protective layer,
the flexible electronic device further comprises
a plurality of traces disposed on the flexible base substrate,
wherein the TFT in each of the plurality of functional element regions is connected with the TFT in another functional element region through at least one of the plurality of traces, and
the thickness d1 of the central region of the rigid protective layer in each of the plurality of functional element regions satisfies: $0.5\ \mu m \leq d1 \leq 5\ \mu m$, and the thickness d2 of the edge region of the rigid protective layer satisfies: $0.3\ \mu m \leq d2 \leq 0.9\ \mu m$,
wherein a tensile strain rate of each of the plurality of traces at a first position of the trace connected with the TFT is minimum, a tensile strain rate of each of the plurality of traces at a second position of the trace in contact with an outer surface of the rigid protective layer is maximum, the tensile strain rate of each of the plurality of traces from the first position to the second position is gradually increased, and a portion of each of the plurality of traces between the first position and the second position is wrapped by the rigid protective layer.

2. The flexible electronic device according to claim 1, wherein in each of the plurality of functional element regions, the rigid protective layer is disposed on a side of the at least one TFT which is different from a side facing the flexible base substrate.

3. The flexible electronic device according to claim 1, wherein an orthographic projection of the edge region of the rigid protective layer on the flexible base substrate is overlapped with an orthographic projection of the trace connecting the TFT in a corresponding functional element region and the TFT in another functional element region on the flexible base substrate.

4. The flexible electronic device according to claim 1, wherein the thickness of the rigid protective layer disposed in each of the plurality of functional element regions is gradually reduced from the central region of the rigid protective layer to the edge region.

5. The flexible electronic device according to claim 1, wherein a shape of a longitudinal cross-section of the rigid protective layer disposed in each of the plurality of functional element regions is a regular trapezoid or arciform.

6. The flexible electronic device according to claim 1, wherein a material of the rigid protective layer disposed in each of the plurality of functional element regions includes rubber or silica gel.

7. The flexible electronic device according to claim 1, wherein a material of the plurality of traces includes metallic material or conductive polymeric material.

8. The flexible electronic device according to claim 1, wherein the flexible electronic device is a sensor, and a tensile strain rate of the plurality of traces is less than or equal to 200%.

9. The flexible electronic device according to claim 1, wherein the flexible electronic device is a flexible display substrate, and a tensile strain rate of the plurality of traces is less than or equal to 100%.

10. The flexible electronic device according to claim 1, wherein an orthographic projection of the functional element region on the flexible display substrate is greater than a region encircled by an orthographic projection of a contour of the at least one TFT on the flexible display substrate.

11. The flexible electronic device according to claim 10, wherein the flexible electronic device further comprises:
a lug boss structure, disposed between an arranging region of the at least one TFT and the flexible display substrate in each of the plurality of functional element regions, wherein a hardness of the lug boss structure is greater than a hardness of a region except the lug boss structure.

12. A flexible display device, comprising the flexible electronic device according to claim 1.

13. A manufacturing method of a flexible electronic device, comprising:
providing a flexible base substrate, the flexible base substrate including a plurality of functional element regions spaced away from each other;
forming at least one TFT in each of the plurality of functional element regions; and
forming a rigid protective layer at least on a side of the at least one TFT opposite to a side where the flexible base substrate is located in each of the plurality of functional element regions, the rigid protective layer being configured to protect the at least one TFT, wherein
a thickness of a central region of the rigid protective layer disposed in each of the plurality of functional element regions is greater than a thickness of an edge region of the rigid protective layer,
before the forming the rigid protective layer, the manufacturing method further comprises:
forming a plurality of traces on the flexible base substrate, wherein the TFT in each of the plurality of functional element regions is connected with the TFT in another functional element region through at least one of the plurality of traces,
the thickness d1 of the central region of the rigid protective layer in each of the plurality of functional element regions satisfies: 0.5 µm≤d1≤5 µm, and the thickness d2 of the edge region of the rigid protective layer satisfies: 0.3 µm≤d2≤0.9 µm,
wherein a tensile strain rate of each of the plurality of traces at a first position of the trace connected with the TFT is minimum, a tensile strain rate of each of the plurality of traces at a second position of the trace in contact with an outer surface of the rigid protective layer is maximum, the tensile strain rate of each of the plurality of traces from the first position to the second position is gradually increased, and a portion of each of the plurality of traces between the first position and the second position is wrapped by the rigid protective layer.

14. The manufacturing method of the flexible electronic device according to claim 13, wherein the forming a rigid protective layer at least on a side of the at least one TFT opposite to a side where the flexible base substrate is located in each of the plurality of functional element regions includes:
forming the rigid protective layer on a side of the at least one TFT which is different from a side facing the flexible base substrate.

15. The manufacturing method of the flexible electronic device according to claim 14, wherein the forming the rigid protective layer on a side of the at least one TFT which is different from a side facing the flexible base substrate, includes:
performing a surface tension modification treatment on the flexible base substrate on which the at least one TFT and the plurality of traces are located by using a gray mask, so that a surface tension of a central region of each of the plurality of functional element regions is greater than a surface tension of an edge region of the functional element region, and the surface tension of the edge region of the functional element regions is greater than a surface tension of a region in the flexible base substrate except the plurality of functional element regions;
coating a liquid rigid material on the flexible base substrate after the surface tension modification treatment; and
forming the rigid protective layer in each of the plurality of functional element regions by solidifying the liquid rigid material.

16. The manufacturing method of the flexible electronic device according to claim 14, wherein the forming the rigid protective layer on a side of the at least one TFT which is different from a side facing the flexible base substrate, includes:

forming a photoresist film on the flexible base substrate on which the at least one TFT and the plurality of traces are located; and performing an exposure treatment on the photoresist film by using a gray mask, performing a development treatment on the photoresist film after the exposure treatment, to form the rigid protective layer in each of the plurality of functional element regions.

17. The manufacturing method of the flexible electronic device according to claim 13, wherein before the forming the at least one TFT and the plurality of traces on the flexible base substrate, the method further comprises:

performing a surface hardness modification treatment on the flexible base substrate.

18. The manufacturing method of the flexible electronic device according to claim 17, wherein the performing the surface hardness modification treatment on the flexible base substrate includes:

forming a lug boss structure in each of the plurality of functional element regions of the flexible base substrate, the lug boss structure is arranged to correspond to an arranging region of the at least one TFT, and a hardness of the lug boss structures is greater than a hardness of a region except the lug boss structure.

* * * * *